May 6 1930.  W. D. HILL  1,757,086
LUBRICATING SYSTEM
Filed Feb. 13, 1928
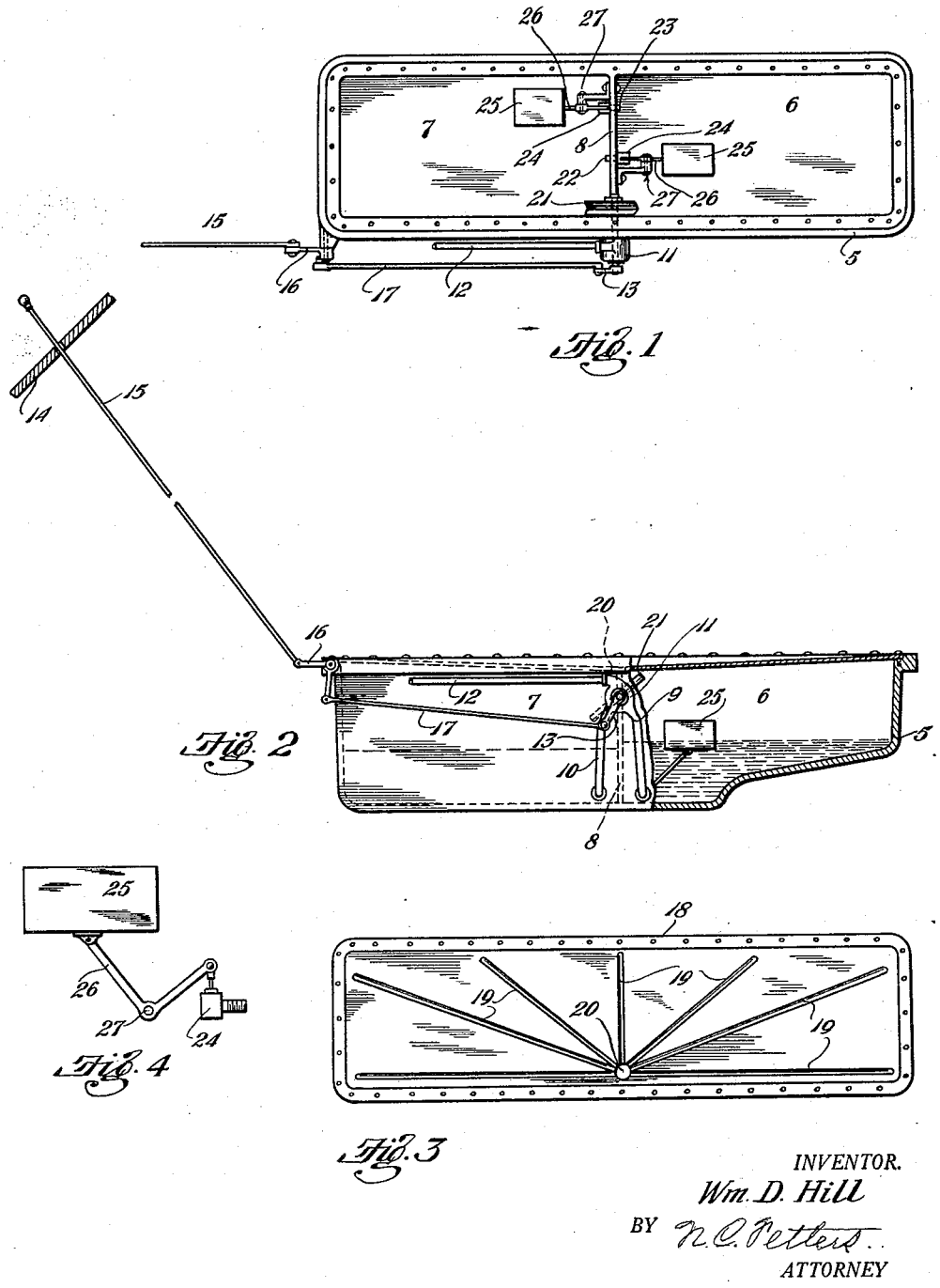
INVENTOR.
Wm. D. Hill
BY
ATTORNEY Patented May 6, 1930

1,757,086

UNITED STATES PATENT OFFICE

WILLIAM D. HILL, OF ALLIANCE, OHIO

LUBRICATING SYSTEM

Application filed February 13, 1928. Serial No. 253,960.

My invention relates to improvements in lubricating system and particularly to a multiple system of lubricating oil supply for combustion engines.

One of the cardinal principles underlying all lubrication is to use the least viscous oil that will stay in place and do the work. The whole problem of lubrication is to get a proper film of oil between metal surfaces where wear would occur and the oil should be sufficiently viscous to prevent it from being squeezed out of the bearing except by unusual pressures. The viscosity of lubricating oils varies with the temperature. Some grades of oil that are quite fluid at ordinary temperatures say 70° Fahrenheit become thick at lower temperatures and "freeze" or become solid at temperatures approaching zero. Other grades of oil maintain their fluidity at extremely low temperatures, but are too thin at ordinary temperatures.

In the lubrication of internal combustion engines it is especially desirable to maintain at all times a proper and uniform oil film to protect the engine from both heat and friction. The absence of a proper oil film between wearing parts results in the cylinders being scored and the bearings burned out and otherwise destroying the usefulness of the engine.

The object of my invention is to prevent these troubles and to supply lubricating oil to the engine of the proper viscosity regardless of the atmospheric temperature or the temperature at which the engine runs.

A further object is to supply to the engine a very thin or light oil when the engine is started up cold and then to change the grade of oil supplied to a heavier and more viscous grade as the temperature of the engine becomes higher, so that at all times the oil film will be of uniform character and of the maximum fluidity and yet possess adhesion enough to prevent the oil from running out of the bearing.

A further object of my invention is to provide a means whereby a light or thin oil can be supplied to an engine to make it easy to start and then after the engine is heated up to supply a heavier oil for subsequent running of the engine.

A further object of my invention is to provide a means whereby a heavy oil can be supplied to an aeroplane motor to start it and for unusual atmospheric temperature and then to supply a lighter or different grade of lubrication oil as the aeroplane encounters the lower temperatures reached at high altitudes of flight.

With these and other objects in view the invention consists in certain novel features of construction and combination of parts which are hereinafter described and as shown on the following drawings accompanying this specification:

Fig. 1 represents a plan view of an oil case suitable for internal combustion engine.

Fig. 2 is an elevation of same partly in vertical section.

Fig. 3 is a plan view of a drip pan acting as a cover for the oil case.

Fig. 4 is a view of float operating check valve.

In the several views described above, 5 is an oil case adapted to form part of the crank chamber of an internal combustion engine. This oil case comprises two compartments or chambers as 6 and 7 adapted to contain lubricating oils of various grades. For example, compartment 6 may contain a heavy grade of lubricating oil and compartment 7, a light grade of oil. The oil compartments are separated by partition 8 which forms a solid diaphragm between the compartments.

Connecting to compartment 6 I provide oil line 9 and connecting to compartment 7 I provide oil line 10, each leading to three-way valve 11 which also has a line 12 to a suitable oil pump. The valve 11 is of any ordinary three-way type but I prefer to have it made so that at no time will it entirely close the oil line 12 to one or other of the oil compartments thus preventing the shutting off entirely of the oil supply to the engine. Valve 11 is operated by valve lever 13 which in turn is actuated from the dash 14 by means of push rod 15 through bell crank 16 and shifting rod 17. As a cover to oil case 5, I provide a suitable drip pan 18 which is supplied with oil grooves 19 which slope toward an outlet or drip hole 20. Underneath this drip hole I provide a drip leaf 21 which is pivoted at its center and actuated by valve lever 13 in such a manner that when valve is thrown so that oil is being taken from compartment 6, the drip leaf will throw the return oil coming from the drip pan back into compartment 6, and then when the valve is turned to take oil from compartment 7 the return oil will flow into the same compartment 7. This is to prevent mixing of different grades of oil in the several compartments.

In partition 8, I provide suitable openings as 22 and 23 communicating with the several compartments. These openings are normally kept closed by suitable check valves 24 which are maintained in the closed position by floats 25 through bell cranks 26 pivoted at 27. These floats are actuated by the level of the oil in their respective compartments and are so arranged that should the oil level in either compartment fall below a pre-determined danger point, the float will drop and open the communication with the adjoining compartment allowing the oil to flow into the compartment in which the oil has fallen below the danger point. Thus is an emergency measure arranged so as to provide a source of lubrication to the engine even though one grade of oil may be nearly exhausted. As soon as the empty compartment is refilled with oil, the float in that compartment will operate to close the check valve and return the system to its normal operating condition.

While I have shown oil case 5 as being divided into two compartments, I have in mind the applications of my system where more than two compartments might be necessary and I, therefore, do not wish to limit my invention to the use of two compartments or two grades of lubricating oil.

While I have shown one embodiment of my invention constructed for an internal combustion engine suitable for automotive purposes, as for trucks, automobiles or aeroplanes, I have in mind its use in connection with other type of prime movers and mechanisms to which it is desirable to provide a lubricant of constant quality regardless of temperature conditions.

What I claim is:

1. A lubricating system of the character described comprising a plurality of oil chambers, communicating means between said chambers, valves for closing off said communication, and means for opening said communication when the oil in any chamber falls below a pre-determined level.

2. A lubricating system of the character described, comprising a plurality of oil chambers, a hand actuated valve, means for connecting each of said chambers to an oil line, said valve actuating means operating to return surplus oil to the chamber from which it was withdrawn.

3. A lubricating system as described comprising an oil case having a plurality of oil chambers, valve means adapted to connect any one of said chambers to the oil supply line of an internal combustion engine, partitions between said oil chambers said partitions having communicating openings, valve means for closing off such communication and means governed by the oil level in said chambers for opening said communicating openings to allow the oil to flow from one chamber into an adjoining chamber.

4. A lubricating system of the character described having an oil reservoir with a plurality of oil compartments, means for withdrawing oil from any one of said compartments and a movable conductor for returning surplus oil to the respective compartment from which it was withdrawn.

5. A lubricating system as described consisting of an oil case having separate compartments, a valve to open any one of said compartments to the oil supply line and to partially close off all other compartments from the oil supply line and a movable conductor to return the surplus oil to the respective chamber from which it was withdrawn.

In testimony whereof, I have signed this specification.

WILLIAM D. HILL.